(12) United States Patent
Lanitz

(10) Patent No.: US 9,279,216 B2
(45) Date of Patent: Mar. 8, 2016

(54) COVERING FABRIC FOR AIRCRAFT IN GENERAL AIR TRAVEL

(76) Inventor: Siegfried Lanitz, Leipzig (DE)

( * ) Notice: Subject to any disclaimer, the term of this patent is extended or adjusted under 35 U.S.C. 154(b) by 803 days.

(21) Appl. No.: 12/615,931

(22) Filed: Nov. 10, 2009

(65) Prior Publication Data

US 2010/0120310 A1     May 13, 2010

Related U.S. Application Data

(63) Continuation-in-part of application No. PCT/DE2008/000836, filed on May 8, 2008.

(30) Foreign Application Priority Data

May 11, 2007 (EP) ..................................... 07090097
Mar. 31, 2008 (DE) ................. PCT/DE2008/000569

(51) Int. Cl.

| B32B 7/04 | (2006.01) |
|---|---|
| D06N 3/14 | (2006.01) |
| A63H 27/00 | (2006.01) |
| C08G 18/08 | (2006.01) |
| C08G 18/73 | (2006.01) |
| C09J 175/06 | (2006.01) |
| D06M 15/564 | (2006.01) |

(52) U.S. Cl.
CPC ............... *D06N 3/14* (2013.01); *A63H 27/001* (2013.01); *A63H 27/02* (2013.01); *C08G 18/0819* (2013.01); *C08G 18/73* (2013.01); *C09J 175/06* (2013.01); *D06M 15/564* (2013.01); *Y10T 442/2098* (2015.04); *Y10T 442/2164* (2015.04); *Y10T 442/2418* (2015.04); *Y10T 442/259* (2015.04); *Y10T 442/2631* (2015.04)

(58) Field of Classification Search
CPC ... Y10S 428/921; Y10S 428/92; Y10S 5/954; B32B 2307/3065; B32B 27/04; B32B 5/024; D06M 2200/30; D06M 15/564; A41D 31/0022; D06N 3/14; A63H 27/001; A63H 27/02; C08G 18/0819; C08G 18/73; C09J 175/06; Y10T 442/2631; Y10T 442/2098; Y10T 442/2418; Y10T 442/2164; Y10T 442/259
USPC .................................. 428/920, 921; 442/136
See application file for complete search history.

(56) References Cited

U.S. PATENT DOCUMENTS

| 3,841,942 A | 10/1974 | Carlson et al. |
| 4,225,372 A | 9/1980 | Kinzler et al. |
| 4,373,003 A * | 2/1983 | Schomburg et al. .......... 442/136 |
| 4,559,975 A * | 12/1985 | Stits .......................... 139/420 R |
| 4,997,688 A * | 3/1991 | Hardman ..................... 428/34.9 |
| 6,548,428 B1 * | 4/2003 | Lanitz et al. .................. 442/149 |
| 2006/0084336 A1 | 4/2006 | Howland et al. |
| 2011/0272525 A1 | 11/2011 | Lanitz |

FOREIGN PATENT DOCUMENTS

| DE | 849 051 | 9/1952 |
| DE | 44 39 031 | 5/1996 |
| EP | 1 288 124 A1 | 3/2003 |
| EP | 1 997 953 A1 | 12/2008 |
| GB | 2 215 746 A | 9/1989 |
| WO | 96/14208 A1 | 5/1996 |

OTHER PUBLICATIONS

Bello et al., "Evaluation of the NIOSH draft method 5525 for determination of the total reactive isocyanate group (TRIG) for aliphatic isocyanates in autobody repair shops," Journal of Environmental Monitoring, 2002, 4, 351-360.*
Desmodur N 75 BA/X MSDS, 2012.*
Desmocoll 540 MSDS, 2012.*
PCT International Preliminary Report on Patentability of International Application No. PCT/DE2008/000836 issued Dec. 7, 2009.

* cited by examiner

*Primary Examiner* — Jeremy R Pierce
(74) *Attorney, Agent, or Firm* — Joyce von Natzmer; Agris & von Natzmer LLP

(57) ABSTRACT

The present invention relates to a covering fabric for covering aircraft. The fabric itself may be coated with one or more layers of a crosslinked anionic aliphatic polyester-polyurethane dispersion and/or is woven from coated fibers or filaments. A covering fabric of the invention may be glued using a thermoactivatable heat-crosslinking adhesive. An advantage of the covering fabric of the invention is that there is no need for further coating of the fabric after covering, and thus significantly less weight is applied by the covering process. Furthermore, the user is able to apply the covering to an aircraft without using any organic solvents in adhesives, tension-inducing varnishes, thinners, fillers or colored varnishes. Thus, an environmentally friendly process is provided for the covering of aircraft.

28 Claims, No Drawings

COVERING FABRIC FOR AIRCRAFT IN GENERAL AIR TRAVEL

CROSS-REFERENCE TO RELATED APPLICATIONS

This is a continuation-in-part (CIP) application of International application no. PCT/DE2008/000836, filed May 8, 2008, which claims priority to European application no. EP 07090097.2, filed May 11, 2007, and International application no. PCT/DE2008/000569, filed Mar. 31, 2008. All of these applications are incorporated herein by reference in their entirety.

FIELD OF THE INVENTION

The invention relates to a covering fabric for aircraft in general aviation and also to a method of manufacturing the covering fabric. The invention also relates to a method for covering such aircraft with the fabric.

BACKGROUND OF THE INVENTION

In the manufacture of aircraft for general aviation and in the manufacture of remote-controlled aircraft, to reduce weight, designs are still used, in which the entire body of the aircraft, or parts thereof, are made of spars and ribs. These can be made of metal, wood and/or plastic and must be covered. The coverings are preferably foils or fabrics that are applied to the structure.

The publications and other materials, including patents, used herein to illustrate the invention and, in particular, to provide additional details respecting the practice are incorporated by reference.

WO 96/14208 A1 (U.S. Pat. No. 6,548,428) discloses a foil that is suited for covering aircraft. A multilayer material is disclosed comprising a polyester carrier foil, onto which a polymer layer, based on polyurethane polymers, is applied, in addition to a pressure-sensitive adhesive layer, which is applied to the polymer layer on the side facing away from the carrier foil. This publication discloses a foil for covering aircraft constructions but not a fabric that is suited for covering.

US 20060084336 A1 discloses a multi-layer, flexible covering fabric for aircraft constructions. This fabric is made of laminated layers and distinguishes itself through especially low gas permeability. Therefore this fabric is especially intended for the construction of Zeppelins.

Furthermore, covering fabrics made of linen, cotton and polyester are known for the use of covering aircraft. These fabrics are applied with nitrocellulose adhesive or chlorinated rubber adhesive to the parts of aircraft that need to be covered, and once the adhesive dries tension is induced in the fabric. To do so the polyester fabrics are shrunk with heat and painted with a varnish. After various coats of varnish, one to two layers of silver varnish are applied for UV protection. Finally the finishing varnish is applied.

In DE 849 051 a covering of aircraft is disclosed, which comprises at least two fabric sheets lying on top of one another, with their warp threads running at an angle to one another. Each fabric sheet is individually stretched, and then connected by a treatment with resin. The fabric sheets are treated with solvent-containing impregnations and after being stretched are treated with tension inducing varnish.

The disadvantage of the fabrics and methods for their processing known from the prior art is, that in the use of polyester fabrics, although the fabric fibres are covered by nitrocellulose adhesive, the adhesive does not bind with the fibres.

Furthermore, nitrocellulose adhesives and varnishes harden further over time, which leads to the embrittlement of the entire adhesion and covering. As a result, the covering becomes vulnerable to mechanical damage and it is possible that parts of the covering become unattached without external force. Lastly, when using the solutions for covering aircraft known in the prior art, a new covering is required after some years.

A further disadvantage of the prior art solutions for the covering of aircraft lies in the uncontrolled gain of weight through the color painting and layers that are applied. In weighing a square meter of the fabric disclosed in the prior art, a gram weight variability of 100 to 400 $g/m^2$ was measured.

Furthermore, polyester fabrics with solvent-based surface covering are known from model plane building, in which the heat sealable adhesive is applied to the back-side. The covering can comprise of a resin solution made of polyurethane or a PVC/PVA co-polymer according to GB 2 215 746 A (U.S. Pat. No. 4,997,688), wherein the resin may have cross-linking agent and catalyst colorant or metal pigment. Furthermore, polyester fabrics for aircraft with a solvent-based surface covering are known, which are distinguished by high strength, but low shrinkage and low further rip resistance. These products are adhered through heat-activatable adhesives that have the disadvantage that under high temperatures they can become soft, the covering loses tension and can even become wrinkled, or the covering can start to float on the adhesive, which significantly limits their useful properties.

Thus, there remains a need in the art to provide a covering material for aircraft that avoids one or more of the disadvantages of the prior art.

The present invention seeks to address at least aspects of said need by the features set forth herein.

SUMMARY OF THE INVENTION

The present invention provides, in one embodiment, a covering fabric for aircraft in general aviation, comprising a polyester- or poly-ether-ether-ketone-fabric, wherein the fabric is covered with a cross-linked heat-resistant anionic aliphatic polyester-polyurethane dispersion. In a preferred embodiment the covering is produced through cross-linking an anionic aliphatic dispersion with a preferred OH-number of <0.5 with a hydrophilic aliphatic polyisocyanate, preferably based on hexamethylene diisocyanate, with a preferred NCO-value of 17 to 18.

A covering fabric according to the present invention that has been coated in this manner exhibits an initial coat. Further layers can be applied to the initial coat and such a coating may be described as primer-coat according to the present invention.

A further object of the present invention is to provide a covering fabric for aircraft in general aviation, comprising a polyester- or poly-ether-ether-ketone-fabric, wherein the fabric is woven from fibers or filaments, respectively ring yarns, filament yarns or twine, that have been previously coated with a cross-linked heat-resistant anionic aliphatic polyester-polyurethane dispersion. In a preferred embodiment the coating of the fibers or filaments, respectively ring yarns, filament yarns or twine, is produced through cross-linking an anionic aliphatic dispersion with a preferred OH-number <0.5 with a hydrophilic aliphatic polyisocyanate, preferably based on hexamethylene diisocyanate, with a preferred NCO-value of 17-18.

According to the present invention the fibers or filaments can be processed to ring yarn, filament yarn or twine before weaving. It is apparent to one skilled in the art that the invention also expressly relates to the coating of the processed fibers or filaments.

Provided the fibers or filaments, respectively ring yarns, filament yarns or twine, are coated before the weaving process, the present invention intends that colored pigments can be added to the heat-resistant anionic aliphatic polyester-polyurethane dispersion. It can also come solely to the use of a color-pigmented dispersion. Colored pigments according to the present invention are not only multi-color pigments, but are also intended to encompass colored preparations comprising titanium dioxide and coloring agents.

The present invention intends that fabrics are produced using coated fibers and filaments, respectively ring yarns, filament yarns or twine, the coating of fabrics produced from either coated or uncoated fibers and filaments, respectively ring yarns, filament yarns or twine. In each case the addition of colored pigments, hydrophobic substances, UV-protection and/or substances to impede combustibility may be provided.

In an alternative embodiment of the covering fabric of the present invention, the anionic aliphatic dispersion can be colored or pigmented. In a preferred embodiment the pigment comprises aluminium particles or further additives that stabilize the fabric against UV rays or other rays that could accelerate the aging of the fabric. Furthermore, hydrophobic substances may be added to the coating of polyester fabrics.

If the primer-coat comprises added aluminium particles, additives for UV-stabilisation and hydrophobic substances, then according to the present invention the coat will be long lasting and durable due to the protective additives. Such a coating is especially resistant against aging processes through environmental influences.

In a further development of the covering fabric according to the invention it is intended that at least one, preferably two further coats of color are applied to the covering fabric. It is preferable that these coats comprise an anionic aliphatic polyester polyurethane dispersion as described above, wherein colored pigments are added to the dispersion.

A covering fabric coated as described above thus exhibits an initial coat (primer-coat), and a second coat that contains colored pigments. The second coat can also be designated as a color-coat according to the present invention.

In a further preferred embodiment of the covering fabric of the present invention an additional coat is provided that has electrically conducting pigments to discharge electrostatic charges and/or an additional coat of a conductive material is applied. In both cases the ohmic value of the electrical conducting coat is preferably between $10^{-7}$ and $10^{-8} \Omega$. Through such coats it is possible to discharge electrical charges without damage to the covered parts. In particular, lightening strikes can be prevented or electrical charges can be discharged. The invention also encompasses the addition of a conductive pigment to the primer-coat.

If a conducting coat is present in the covering, conducting rods need to be attached to the outer ends of the aircraft after the covering (Transition zone, trailing edge/wing tip and also ailerons, in addition to the elevator/horizontal rudder and optionally the vertical stabilizer/vertical rudder) against the air. It must be ensured that the conducting coat is exposed at the point of connection between the coat and the conduction rod and that an intimate connection between the coat and the rod is ensured. For example, this can take place with the help of a conductive copper paste. The conducting rods are attached where appropriate in the direction of flow on the underside.

Furthermore a covering fabric is provided, upon which a surface layer is applied. The surface layer comprises an anionic aliphatic polyester-polyurethane dispersion as described above and is intended to be used with a UV-blocker or -adsorber and/or hydrophobic substances.

A covering fabric according to the present invention is provided that exhibits optionally—independent from the intended purpose—multiple coats, wherein not all coats need be applied to the covering fabric, and a single coat can be obtained through multiple applications of the corresponding compound. To increase the adhesiveness of the coat to be applied to the fabric, the present invention intends an optional plasma-, respectively coronizing-treatment of the surface of the fabric onto which the coats should be applied. The adhesiveness of the coats between each other can also be optimised through plasma-, respectively coronizing-treatment.

As already described, a multi-layer coating of the fibers and filaments, respectively ring yarns, filament yarns or twine, is intended, wherein a coating system can comprise a primer-coat, a color-coat and a surface-coat. Fibers or filaments, respectively ring yarns, filament yarns or twine, that are coated in such a manner are then worked into a fabric that can also be coated again as described above.

A covering fabric comprising a polyester- or poly-ether-ether-ketone-fabric is intended as a short-lived covering fabric for aircraft according to the present invention, wherein the fabric is coated solely with a cross-linked color-pigmented heat-resistant anionic aliphatic polyester-polyurethane dispersion. The coating is produced through cross-linking an anionic aliphatic color-pigmented dispersion with a preferred OH-number <0.5 with a hydrophilic aliphatic polyisocyanate, preferably based on hexamethylene diisocyanate with a preferred NCO-value of 17 to 18.

A short-lived covering fabric is also provided wherein the fabric to be coated comprises fibers or filaments, respectively ring yarns, filament yarns or twine, that were coated before weaving with a cross-linked color-pigmented heat resistance anionic aliphatic polyester-polyurethane dispersion.

The covering fabrics according to the present invention have a fineness of gauge 30-350 dtex according to DIN 53830 T3. In this context DIN is the abbreviation for the "Deutsche Industrienorm", or German industry norm, according to the German institute for standardisation. These national industry norms can be checked in a directory and represent defined standards. In the following passages the DIN numbers will refer to the demonstrated norms.

It is further intended that the uncoated gram weight, or grammage, of a covering fabric of the present invention according to DIN EN 12127 exhibits a weight per unit area between 30 g/m² to 250 g/m².

In a further embodiment of the invention the number of single filaments, of which the threads are comprised, in warp and weft is preferably between 15 and 80, and the number of threads according to DIN EN 1049-2 is preferably 15-60 in the warp and 15-60 in the weft. Furthermore, the invention makes provision for covering fabrics wherein the warp-threads or warp- and weft-threads are finished. Through the finishing the single filaments lying parallel to each other are combined, which can influence the ductility.

To achieve a high strength of the warp-threads and/or weft-threads of the covering fabric, single filaments of the warp-threads are twisted with one another to form a filament bundle.

It is intended for a covering fabric of the present invention that the shrink of the fabric is preferably about 10% longitudinally and transversely at a preferred temperature of 150° C. Through this measure an optimal processing of the covering fabric is made possible.

It is also intended by the present invention that a transverse shrinkage of preferably about 10% is achieved, respectively retained, during the drying of the coating in a drying channel by stretching on a frame.

Furthermore it is intended that the weave takes place as a plain weave or Ripstop.

The coating of the covering fabric according to the present invention is based on an aqueous polyurethane system. This measure serves environmental grounds and leads to the avoidance of $CO_2$ emissions during production. Nevertheless the invention also encompasses coatings based on solvent-containing systems.

In a preferred embodiment of the subject matter of the present invention, the covering fabric comprises one or more of the described coatings, which additionally can be coated with an adhesive that comprises a thermo-activatable heat-crosslinking adhesive substance based on an aqueous, anionic dispersion of a high molecular weight polyurethane with a preferred OH-number <0.5 with a preferred 15% hardening formulation made of encapsulated isocyanates, wherein at a heat-input of more than 40° C. the polyurethane adhesive becomes crosslinked.

Lastly, a method of manufacture for a covering fabric for aircraft in general aviation is also an object of the present invention, wherein a polyester- or poly-ether-ether-ketone-fabric with a primer-coat is produced, in that a cross-linked heat-resistant anionic aliphatic polyester-polyurethane dispersion is produced through cross-linking an anionic aliphatic polyisocyanate with a preferred OH-number <0.5 with a hydrophilic aliphatic polyisocyanate, preferably based on hexamethylene diisocyanate with a preferred NCO-value of 17 to 18, and subsequently a polyester or poly-ether-ether-ketone-fabric is then coated with the coating described above. Alternatively, fibers or filaments, respectively ring yarns, filament yarns or twine, are processed to form a polyester- or poly-ether-ether-ketone-fabric, wherein the fibers or filaments are coated with a cross-linked heat-resistant anionic aliphatic polyester-polyurethane dispersion before being processed into a fabric, wherein the coating is produced through cross-linking an anionic aliphatic dispersion with a preferred OH-number of <0.5 with a hydrophilic aliphatic polyisocyanate preferably based on hexamethylene diisocyanate with a preferred NCO-value of 17 to 18.

According to the present invention it is also intended that fabric or fibers or filaments, respectively ring yarns, filament yarns or twine, from which the fabric is produced, can be coated solely with a cross-linked and color-pigmented heat-resistant anionic aliphatic polyester-polyurethane dispersion.

Furthermore, it is intended that fabrics or fibers or filaments, respectively ring yarns, filament yarns or twine, can be additionally coated with an adhesive, which comprises a thermo-activatable heat-crosslinking adhesive substance based on an aqueous anionic dispersion of a high molecular weight polyurethane, preferably with an OH-number <0.5 with a preferably 15% hardening-formulation made of encapsulated isocyanates.

In one embodiment of the present invention it is intended that a pigmented anionic aliphatic dispersion can be used which is pigmented preferably with aluminium particles.

It is further intended by the present invention that in the coating of the fabric additional hydrophobic substances can be added or that a hydrophobic layer can be applied before application of the primer-coat to fabric, fibers or filaments.

If a colorisation of the covering fabric is to be achieved, then at least one, preferably two color-coats can be applied additionally to the fabric or fibers or filaments, respectively ring yarns, filament yarns or twine, out of which the covering is made. These coats can have differing colors, so that patterns, numbers and also letters can be applied as markings.

In order to discharge lightening strikes or electric charges, the present invention provides, in a preferred embodiment, that an additional coat can be applied, preferably comprising an anionic aliphatic polyester-polyurethane dispersion disclosed herein (claim 1) intended to comprise of at least one electrically conducting pigment, and/or an additional coat comprising of an electrically conducting material can be applied. The discharge of charge carried out by such a coat is effected by conducting rods against the air.

In order to improve the longevity of the covering produced through the manufacturing process, it is an object of the present invention that a surface layer is applied, preferably comprising an anionic aliphatic polyester-polyurethane dispersion disclosed herein (claim 1), that may comprise UV-blockers or -adsorbers and hydrophobic substances.

According to the present invention a fabric can be used that has preferably a fineness from 30-350 dtex according to DIN 53830 T3. Furthermore, this fabric can exhibit an uncoated gram weight with a weight per unit area between 30 g/m$^2$ to 250 g/m$^2$ according to DIN EN 12127, wherein threads can be used in which the number of single filaments, of which the threads are comprised, in warp and weft is preferably between 15 and 80.

In a preferred embodiment a fabric can be used wherein the shrinkage of the fabric at a temperature of about 150° C. is approximately 10% longitudinally and transversely, and/or a transverse shrinkage of preferably about 10% can be achieved during the drying of the coating in a drying channel by stretching on a frame.

In order to prevent destruction of the resulting fabric, or structures to be covered by the fabric, it is intended that a self-extinguishing coat can be additionally applied.

Furthermore, it is a preferred embodiment of the invention that every coat of the covering fabric, or the last applied coat, is calendered for hardening and improving the adhesion of the coat.

Finally, a process for covering aircraft in general aviation, especially aeroplanes, is included in the subject matter of the present invention, wherein the process is characterised by the following steps:

a. a covering fabric of the present invention according to one of claims 1 to 20 is brought into contact, in the area in which the fabric is joined to a structure, with an adhesive comprising a heat-activatable, heat-crosslinking adhesive substance based on an aqueous, anionic dispersion of a high molecular weight polyurethane with a preferred OH-number <0.5 with a preferred 15% hardening-formulation made of encapsulated isocyanates, wherein the structure is also coated or painted with the adhesive, and b. after drying the adhesive, the covering fabric is ironed onto the structure, and c. the areas where the covering fabric has been ironed onto the structure are heated by an appropriate heat source (iron) to about 95-105° C., preferably 100° C., and d. as soon as the adhesive has cooled, all covered areas are tensed by an appropriate heat source (for example a quartz radiator or hot air gun) at approximately 150° C. surface temperature, wherein e. It must be ensured that the seams and overlaps, in addition to concave pieces, are at this stage not heated over about 100° C. surface temperature, in order to prevent activation of the adhesive, through which otherwise the seams and overlaps could release themselves from the concave pieces.

The adhesive is therefore also intended for a separate coating from the described coated covering fabric. For processing, the adhesive can be sprayed onto the structure that is to be covered. This can also occur in an area where the covering fabric is to be stuck to the structure.

After drying the covering is ironed on the structure. After that, all ironed regions are heated to approximately 100° C. with a hot air gun, a radiant heat source or an iron in order to ensure a secure crosslinking of the adhesive, in that the encapsulated isocyanates change their aggregate condition and thus crosslink the polyurethane adhesive. After cooling of the adhesive all covered areas are tensed with a hot air gun, respectively heat source, at approximately 150° C.

Particularly advantageous in the present invention is that the fabric, due to its layering, already encompasses all the individual coats that could otherwise be applied. The task of applying many layers, as for particular varnishes or color coats, does not apply here because the fabric is already intended to contain a color-pigmented coat.

Use of the dispersion described herein allows an environmentally friendly covering in comparison to evaporating solvents. The present invention however also encompasses expressly the use of adhesives and covering systems based on solvents.

A secure and temperature-independent connection between the covering and the structure is ensured through use of the adhesive according to the present invention. In contrast to the solutions described in the prior art, an increase in temperature does not lead to a softening of the adhesive or to the fabric wrinkling, wherein the fabric could begin to float on the soft adhesive.

The reaction of the adhesive is reversible at temperatures >100° C., which can only be achieved by the extreme addition of heat in order to provide the possibility of specific removal of the covering for revision or repair purposes. Thus the adhesive as used in the present invention ensures an ongoing durable strength.

Due to the substances of the present invention that are intended as additives for the coatings, the ageing process of the covering fabric, for example through UV-rays or other natural factors, is significantly slowed.

In coating the fabric a production plant with an adjustable stretching frame is to be used, so that the fabric can be stretched cross-wise on the frame during the drying in order to achieve and maintain the preferable approximate 10% transverse shrinkage of the fabric.

The present invention is also directed at a kit for the covering of aircraft, comprising a covering fabric of the present invention and an adhesive for coating the fabric, which comprises a thermo-activatable, heat-crosslinking adhesive substance based on an aqueous anionic dispersion of high molecular weight polyurethane with an OH-number <0.5 with a 15% hardening-formulation made of encapsulated cyanates. Additionally the kit can contain serrated belts or tapes and/or reinforcement tapes.

Such a kit provides all tools necessary to cover an aircraft, whether it be an aeroplane or a model aeroplane, with the covering fabric of the present invention.

Overall the covering fabric and adhesive according to the present invention lead to the fact that considerably less weight is attached to the aircraft which is to be covered. This is particularly advantageous when applied to small or light aircraft such as remote controlled aircraft, unmanned reconnaissance aircraft, ultra-light aircraft and category-E aircraft.

It is of fundamental importance for the coating of a fabric that the coat is applied and does not permeate the fibers or filaments, respectively ring yarns, filament yarns or twine. The depth of coating of the fabric should only amount to approximately ⅓ of the fabric thickness, in order to protect the fabric from the permeation of water or other liquids and to produce an airtight coat.

A further advantage of the coating of the fabric according to the present invention is that the fabric itself maintains elasticity. In the methods known in the prior art the fabric was soaked in resin. This represents an encroachment in the structure of the fibers or filaments of which the fabric is made. The drying of the resin or other liquids in which the fabric is soaked leads to a loss of elasticity of the fabric. Through this, the danger of damage to the covering through the forces present in the operation of an aircraft is increased, especially on the wings. Such a soaking also negatively influences the rip-resistance.

DETAILED DESCRIPTION OF VARIOUS AND PREFERRED EMBODIMENTS

EXAMPLES

Example 1

Covering Fabric for Ultra-light Aircraft of Up to Approximately 600 kg Takeoff Weight In order to produce a covering fabric of the above-mentioned specifications the following was undertaken:

For the warp: One can create a warp with approximately 43 threads for every cm. For creation of the warp a high-strength polyester thread is applied with a residual shrinkage of 5-12%. The total weight of the raw fabric without coating should lie between 70 and 100 g/m$^2$. In order to obtain this weight, filament yarn with approximately 70 DETEX and a diameter of approximately 0.15-0.20 mm is used. In order to control the elasticity of the fabric the filaments could be additionally twisted.

The twisting influences the E-module of the fabric, respectively the elastic components in the fabric. As weft yarn, threads of an identical material are used. In this example approximately 32 threads are deployed for the weft. However these numbers can by all means vary to a significant extent. In weaving it must be ensured that the weave occurs without stress or warping. In using certain finishes in the fibers, particularly with Skybon, a washing after the weaving is not essential, as the Skybon coats can be simultaneously deployed as a contact-area between the coating and fibers.

It is recommended that before the coating, as a separate process or online, that the fabric is coronized or pre-treated with plasma in order to achieve an optimal anchoring of the coating composition to the filament yarn. The coating comprises polyurethane. Depending on the E-module to be achieved and the desired properties, polyester-, polyether- or polycarbonate-polyurethane, or mixtures thereof, can be applied. In order to optimize the processing and performance characteristics the system must be crosslinked.

Amongst other things, increased temperature stability, in addition to chemical and solvent strength, is obtained through the crosslinking. The crosslinking can also control the degree of hardness of the fabric in combination with the mixtures. Should the PU-system be based on solvents, it must contain sufficient OH-groups with an OH-number <0.5 in order to achieve the corresponding crosslinking; which is achieved with a hydrophilic, aliphatic polyisocyanate based on hexamethylene diisocyanate with a NCO-value of 17-18. When one binds the dispersion system at hand according to the present invention, the dispersion system reacts over urea formation as a secondary crosslinking to polyurethane. In this case a hydrophilic aliphatic polyisocyanate based on hexamethylene diisocyanate, with a proportion of 2.5-4.0 proportion by weight (NCO-value of 17-18), is also used as a crosslinker.

In order to achieve a reasonable weight ratio the fabric is coated twice with the above-mentioned color-pigmented coating composition. In the coating process it must be ensured that the shrinkage should not be removed from the fabric to be covered through the activities in the drying channel. Should the shrinkage be about 5% or less, one can increase the shrinkage through the fixation temperature and relaxation ratio. After the color coating at least one UV-protection system is applied. In order to enhance the value of the product, the fabric should be treated with at least two UV-coating procedures. One can also additionally add a hydrophobic substance to the UV-coating. The material produced as described is now applicable as a covering material for ultra-light aircraft. In a strength test the tensile strength should be at or above 600N.

Example 2

Covering Fabric for Light Aircraft of Up to Approximately 3000 kg Takeoff Weight In order to produce a covering fabric of the above-mentioned specifications the following was undertaken:

For the warp: One can create a warp with approximately 27 threads for every cm. For creation of the warp a high-strength polyester thread is presented with a residual shrinkage of 5-12%. The total weight of the raw fabric without coating should lie between 70 and 100 g/m$^2$. In order to obtain this weight, filament yarn with approximately 180 DETEX is used. In order to control the elasticity of the fabric the filaments could be additionally twisted.

The twisting influences the E-module of the fabric, respectively the elastic components in the fabric. As weft yarn, threads of an identical material are used. In this fabric class approximately 24 threads are deployed for the weft. However these numbers can by all means vary to a significant extent. In weaving it must be ensured that the weave occurs without stress or warping. In using certain finishes in the fibers, particularly with Skybon, a washing after the weaving is not essential, as the Skybon coats can be simultaneously deployed as a contact-area between the coating and fibers.

It is recommended that before the coating, as a separate process or online, that the fabric is coronized or pre-treated with plasma in order to achieve an optimal anchoring of the coating composition to the filament yarn. The coating comprises polyurethane. Depending on the E-module to be achieved and the desired properties, polyester-, polyether- or polycarbonate-polyurethane, or mixtures thereof, can be applied. In order to optimize the processing and performance characteristics the system must be crosslinked.

Amongst other things, increased temperature stability, in addition to chemical and solvent strength, is obtained through the crosslinking. The crosslinking can also control the degree of hardness of the fabric in combination with the mixtures. Should the PU-system be based on solvents, it must contain sufficient OH-groups with an OH-number <0.5 in order to achieve the corresponding crosslinking; which is achieved with a hydrophilic, aliphatic polyisocyanate based on hexamethylene diisocyanate with a NCO-value of 17-18. When one binds the dispersion system at hand according to the present invention, the dispersion system reacts over urea formation as a secondary crosslinking to polyurethane. In this case a hydrophilic aliphatic polyisocyanate based on hexamethylene diisocyanate, with a proportion of 2.5-4.0 proportion by weight (NCO-value of 17-18), is also used as a crosslinker.

In order to achieve a reasonable weight ratio the fabric is coated twice with the above-mentioned color-pigmented coating composition. In the coating process it must be ensured that the shrinkage should not be removed from the fabric to be covered through the activities in the drying channel. Should the shrinkage be about 5% or less, one can increase the shrinkage through the fixation temperature and relaxation ratio. After the color coating at least one UV-protection system is applied.

In order to enhance the value of the product, the fabric should be treated with at least two UV-coating procedures. One can also additionally add a hydrophobic substance to the UV-coating. The material produced as described is now applicable as a covering material for light aircraft up to 3000 kg. In a strength test the tensile strength should be at or above 850N.

Example 3

Covering Fabric for Light Aircraft of Up to Approximately 6000 kg Takeoff Weight In order to produce a covering fabric of the above-mentioned specifications the following was undertaken:

For the warp: One can create a warp with approximately 22-27 threads for every cm. For creation of the warp a high-strength polyester thread is presented with a residual shrinkage of 5-12%. The total weight of the raw fabric without coating should lie between 110 and 130 g/m$^2$. In order to obtain this weight, filament yarn with approximately 180 DETEX is used. In order to control the elasticity of the fabric the filaments could be additionally twisted.

The twisting influences the E-module of the fabric, respectively the elastic components in the fabric. As weft yarn, threads of an identical material are used. In this example approximately 18-22 threads are deployed for the weft. However these numbers can by all means vary to a significant extent. In weaving it must be ensured that the weave occurs without stress or warping. In using certain finishes in the fibers, particularly with Skybon, a washing after the weaving is not essential, as the Skybon coats can be simultaneously deployed as a contact-area between the coating and fibers.

It is recommended that before the coating, as a separate process or online, that the fabric is coronized or pre-treated with plasma in order to achieve an optimal anchoring of the coating composition to the filament yarn. The coating comprises polyurethane. Depending on the E-module to be achieved and the desired properties, polyester-, polyether- or polycarbonate-polyurethane, or mixtures thereof, can be applied. In order to optimize the processing and performance characteristics the system must be crosslinked.

Amongst other things, increased temperature stability, in addition to chemical and solvent strength, is obtained through the crosslinking. The crosslinking can also control the degree of hardness of the fabric in combination with the mixtures. Should the PU-system be based on solvents, it must contain sufficient OH-groups with an OH-number <0.5 in order to achieve the corresponding crosslinking; which is achieved with a hydrophilic, aliphatic polyisocyanate based on hexamethylene diisocyanate with a NCO-value of 17-18. When one binds the dispersion system at hand according to the present invention, the dispersion system reacts over urea formation as a secondary crosslinking to polyurethane. In this case a hydrophilic aliphatic polyisocyanate based on hexamethylene diisocyanate, with a proportion of 2.5-4.0 proportion by weight (NCO-value of 17-18), is also used as a crosslinker.

In order to achieve a reasonable weight ratio the fabric is coated twice with the above-mentioned pigmented-pigmented coating composition. In the coating process it must be ensured that the shrinkage should not be removed from the fabric to be covered through the activities in the drying canal. Should the shrinkage be about 5% or less, one can increase the shrinkage through the fixation temperature and relaxation ratio. After the color coating at least one UV-protection system is applied. In order to enhance the value of the product, the fabric should be treated with at least two UV-coating procedures. One can also additionally add a hydrophobic substance to the UV-coating. The material produced as described is now applicable as a covering material for light aircraft of up to 6000 kg. In a strength test the tensile strength should be at or above 1100N.

Of course, the embodiments of the invention described above are intended to be exemplary only. The scope of the invention is therefore intended to be limited solely by the scope of the appended claims.

What is claimed is:

1. Covering fabric, comprising
a polyester- or poly-ether-ether-ketone-woven fabric, wherein the fabric exhibits a coating of a crosslinked heat-resistant anionic aliphatic polyester-polyurethane dispersion, wherein the fabric has a fabric thickness and a depth of the coating amounts to approximately ⅓ of the fabric thickness and wherein the fabric is configured for aircrafts in general aviation.

2. Covering fabric, comprising
a polyester- or poly-ether-ether-ketone-fabric, wherein the fabric comprises woven fibers or filaments, wherein the fibers or filaments exhibit a coating of crosslinked heat-resistant anionic aliphatic polyester-polyurethane dispersion, wherein the fabric has a fabric thickness and a depth of the coating amounts to approximately ⅓ of the fabric thickness and wherein the fabric is configured for aircrafts in general aviation.

3. Covering fabric according to claim 2, wherein the woven fibers or filaments exhibit a coating of one or more additional crosslinked heat-resistant anionic aliphatic polyester-polyurethane dispersion coats.

4. Covering fabric according to claim 1, wherein the coating is produced though crosslinking an anionic aliphatic dispersion via a crosslinker with a hydrophilic aliphatic polyisocyanate.

5. Covering fabric according to claim 2, wherein the heat-resistant anionic aliphatic polyester-polyurethane dispersion comprises additives, wherein the additives are color-pigments, electrically conducting pigments, aluminum particles, UV-blockers, UV-adsorbers, hydrophobic substances and/or substances to impede combustibility.

6. Covering fabric according to claim 1, wherein the fabric exhibits an additional coat which comprises an electrically conducting material.

7. Covering fabric according to claim 1, wherein the fabric exhibits an additional coat of an adhesive, which comprises a thermo-activatable, heat-crosslinked adhesive substance based on an aqueous anionic dispersion of a high molecular weight polyurethane.

8. Method for coating aircraft in general aviation, comprising:

a. bringing a covering fabric according to claim 1 into contact with an adhesive in the area where it is to be attached to a structure, the adhesive comprising a thermo-activatable, thermal-crosslinking adhesive substance based on an aqueous anionic dispersion of a high molecular weight polyurethane with an OH-number <0.5, with a 15% hardening-formulation made of encapsulated isocyanates, wherein the structure is also coated with the adhesive, and
b. after drying the adhesive, ironing the covering fabric onto the structure, and
c. heating the areas in which the covering fabric is ironed onto the structure via a suitable heat-source to approximately 95-100° C.,
d. when the adhesive has cooled, tensing all covered areas via a suitable heat-source at approximately 150° C. surface temperature, wherein
e. the seams and overlaps, in addition to concave pieces, are at this stage not to be heated over approximately 100° C. surface temperature, in order to prevent activation of the adhesive, through which otherwise the seams and overlaps could release themselves from the concave pieces.

9. Kit for covering aircraft in general aviation, comprising, in one container, a covering fabric according to claim 1 and, in a separate container, an adhesive for coating the fabric, which is made of a thermo-activatable, heat-crosslinked adhesive substance based on an aqueous anionic dispersion of a high molecular weight polyurethane with an OH-number <0.5, with a 15% hardening-formulation made of encapsulated isocyanates, wherein the polyurethane adhesive is crosslinked by supplying heat of more than 40° C.

10. Kit according to claim 9 further comprising serrated belts or tape and/or reinforcement tapes.

11. Covering fabric according to claim 4, wherein an aliphatic polyisocyanate based on hexamethylene diisocyanate, with a proportion of 2.5-4.0 percentage by weight of the coating produced though said crosslinking and an NCO-value of 17-18, is the crosslinker.

12. Kit according to claim 9 further comprising instructions on how to cover an airplane or part thereof with said covering fabric.

13. An aircraft for general aviation or a part thereof comprising the fabric of claim 1.

14. Covering fabric according to claim 4, wherein the hydrophilic aliphatic polyisocyanate is based on hexamethylene diisocyanate with a NCO-value.

15. Covering fabric according to claim 14, wherein the NCO-value is 17 to 18.

16. Covering fabric according to claim 7, wherein the high molecular weight polyurethane has an OH-number <0.5.

17. Covering fabric according to claim 7, wherein the heat-crosslinked adhesive substance contains a 15% hardening-formulation made of encapsulated isocyanates.

18. The kit of claim 9, wherein the adhesive comprises a 15% hardening-formulation made of encapsulated isocyanates.

19. The kit of claim 9, wherein the polyurethane adhesive is crosslinked by supplying heat of more than 40° C.

20. The covering fabric of claim 4, wherein the anionic aliphatic dispersion has an OH-number <0.5.

21. The covering fabric according to claim 2, wherein the woven fibers or filaments are ring yarn, filament yarn or twine.

22. The covering fabric of claim 1, wherein the fabric is elastic.

23. The covering fabric of claim 1 comprising warp- and weft-threads, and wherein the warp-threads or warp- and weft-threads are optionally finished.

24. The covering fabric of claim 3, wherein the woven fibers or filaments are ring yarns, filament yarns or twine.

25. The covering fabric of claim 1, wherein the fabric is configured for aircrafts up to 6000 kg.

26. The covering fabric of claim 25, wherein the weight of the covering fabric is 70 to 100 g/m$^2$ or 110 to 130 g/m$^2$.

27. The covering fabric of claim 1, wherein the fabric is configured for aircrafts up to 600 kg.

28. The covering fabric of claim 1, wherein the fabric is configured for aircrafts up to 3000 kg.

\* \* \* \* \*